United States Patent
Lee et al.

(10) Patent No.: US 10,429,494 B2
(45) Date of Patent: Oct. 1, 2019

(54) METHOD AND APPARATUS FOR DETECTING TARGET OBJECT

(71) Applicant: MANDO CORPORATION, Pyeongtaek-si, Gyeonggi-do (KR)

(72) Inventors: JaeEun Lee, Seoul (KR); HaeSueng Lim, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 351 days.

(21) Appl. No.: 15/371,208

(22) Filed: Dec. 7, 2016

(65) Prior Publication Data

US 2017/0184702 A1    Jun. 29, 2017

(30) Foreign Application Priority Data

Dec. 23, 2015   (KR) .................... 10-2015-0185166

(51) Int. Cl.
| | |
|---|---|
| *G01S 7/41* | (2006.01) |
| *G01S 13/93* | (2006.01) |
| *G01S 7/35* | (2006.01) |
| *G01S 13/34* | (2006.01) |
| *G01S 13/86* | (2006.01) |

(52) U.S. Cl.
CPC .............. *G01S 7/414* (2013.01); *G01S 7/354* (2013.01); *G01S 13/34* (2013.01); *G01S 13/931* (2013.01); *G01S 13/867* (2013.01); *G01S 2007/356* (2013.01)

(58) Field of Classification Search
CPC .. G01S 13/931; G01S 2007/356; G01S 7/354; G01S 13/34; G01S 13/78; G01S 17/89; G01S 13/867; G01S 7/414; G01S 13/5244; G01S 15/8981; G01S 7/292; G01S 7/527

See application file for complete search history.

(56) References Cited

U.S. PATENT DOCUMENTS

| | | | | |
|---|---|---|---|---|
| 6,469,659 | B1 * | 10/2002 | Lajiness | G01S 7/4004 342/159 |
| 6,809,681 | B1 * | 10/2004 | Niechayev | G01S 13/26 342/109 |
| 8,717,230 | B1 * | 5/2014 | Fischi | G01S 7/2813 342/159 |

(Continued)

*Primary Examiner* — Olumide Ajibade Akonai
(74) *Attorney, Agent, or Firm* — Hauptman Ham, LLP

(57) ABSTRACT

The present disclosure relates to a method and apparatus for detecting a target object by a radar device for a vehicle. The method includes recognizing the situation that causes the deterioration in the function of a radar, and preventing the performance from deterioration through a signal processing technology. The apparatus includes: a signal transmitting unit that transmits a transmission signal for detecting a target object; a signal receiving unit that receives a reception signal generated by a reflection of the transmission signal; a signal analyzing unit that calculates frequency spectrum information of the reception signal, and extracts periodicity information for determining a periodicity of the frequency spectrum information; a determining unit that determines whether a clutter structure exists; and a target detecting unit that detects a target object by deleting a peak value component of the periodicity information when it is determined that the clutter structure exists.

16 Claims, 13 Drawing Sheets

(56) References Cited

U.S. PATENT DOCUMENTS

| | | | | |
|---|---|---|---|---|
| 2006/0098751 A1* | 5/2006 | Zhang | ............... | H04L 27/2602 |
| | | | | 375/260 |
| 2014/0240169 A1* | 8/2014 | Lee | ............... | G01S 7/292 |
| | | | | 342/159 |
| 2015/0323649 A1* | 11/2015 | Lee | ............... | G01S 13/04 |
| | | | | 342/27 |
| 2016/0012164 A1* | 1/2016 | Minassian | ............... | G06F 17/5009 |
| | | | | 703/2 |

* cited by examiner

FIG. 1
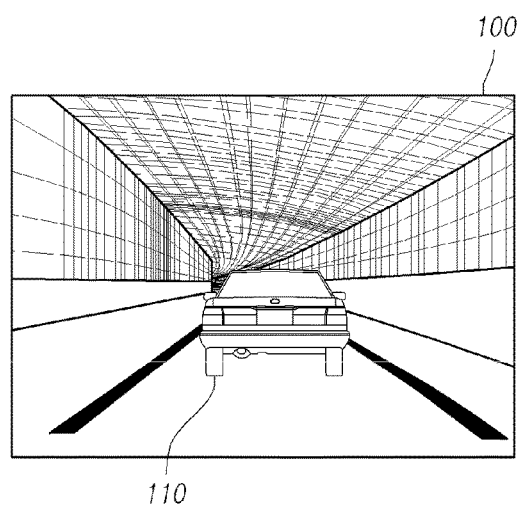
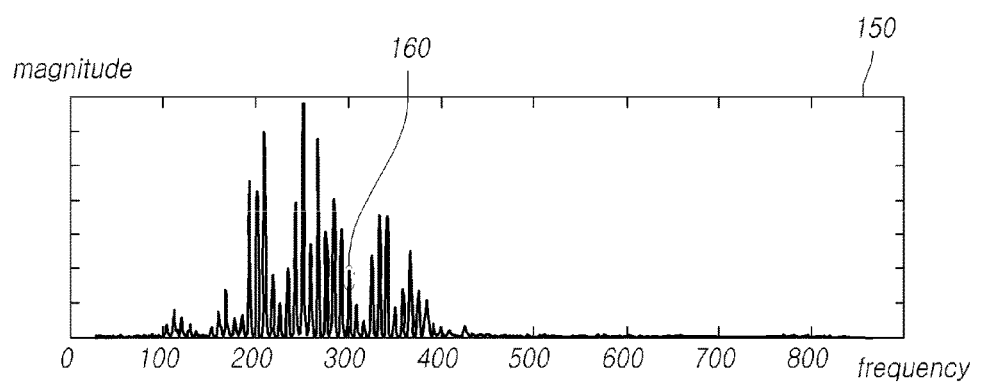

METHOD AND APPARATUS FOR DETECTING TARGET OBJECT

CROSS REFERENCE TO RELATED APPLICATION

This application claims priority from Korean Patent Application No. 10-2015-0185166, filed on Dec. 23, 2015, which is hereby incorporated by reference for all purposes as if fully set forth herein.

BACKGROUND OF THE INVENTION

1. Field of the Invention

The present invention relates to a method and apparatus for detecting a target object by a radar device for a vehicle, and particularly, to a method and apparatus for recognizing the situation that causes the deterioration in the detecting function of a radar device, such as a steel tunnel, and preventing performance from deteriorating through a signal processing technology.

2. Description of the Prior Art

A vehicle-mounted radar indicates a radar device provided in various forms that can be mounted on a vehicle, and indicates a device that is used for reducing the probability of an accident caused by a weather condition or carelessness of a driver and for detecting an object existing around the vehicle.

As the interest in safety and driver's convenience has increased, various technologies associated with a vehicle's safety and convenience using the vehicle-mounted radar device have been developed. Various technologies have been developed, for example, a smart cruise technology that detects a forward vehicle and drives a vehicle by automatically following the detected forward vehicle, an autonomous driving technology, an automatic emergency brake technology, and the like The vehicle-mounted radar, which may be widely utilized for the technologies, may detect a neighboring object based on a reflective signal that is reflected after a radar signal is transmitted.

However, in a section where a steel tunnel or a soundproof wall is installed and a section where a structure that reflects a great amount of electromagnetic waves is installed, it is frequently found that a noise signal is received to be larger than a target signal. Due to this phenomenon, a vehicle may not detect a forward target vehicle, and may not previously detect a forward target vehicle based on a vehicle setting, which are drawbacks.

SUMMARY OF THE INVENTION

In this background, an aspect of the present invention is to provide a method and apparatus for recognizing whether a structure that may significantly generate a clutter signal, such as a steel tunnel, exists by analyzing a reception signal obtained by a radar device.

Also, another aspect of the present invention is to provide a method and apparatus for recognizing a structure that may significantly generate a clutter signal and for enhancing a target detecting performance for improving safety in a section where the corresponding structure is installed.

In accordance with an aspect of the present invention, there is provided a target object detecting apparatus, the apparatus including: a signal transmitting unit configured to transmit a transmission signal for detecting a target object; a signal receiving unit configured to receive a reception signal generated by a reflection of the transmission signal; a signal analyzing unit configured to calculate frequency spectrum information of the reception signal, and to extract periodicity information for determining periodicity of the frequency spectrum information; a determining unit configured to determine whether a clutter structure exists; and a target detecting unit configured to detect a target object by suppressing a peak value component of the periodicity information when it is determined that a clutter structure exists.

In accordance with an aspect of the present invention, there is provided a target object detecting method, the method including: a signal transmission operation to transmit a transmission signal for detecting a target object; a signal reception operation to receive a reception signal generated by a reflection of the transmission signal; a signal analysis operation to calculate frequency spectrum information of the reception signal, and to extract periodicity information for determining periodicity of the frequency spectrum information; a determination operation to determine whether a clutter structure exists; and a target detection operation to detect a target object by suppressing a peak value component of the periodicity information when it is determined that the clutter structure exists.

As described above, according to an embodiment of the present invention, there is provided a method and apparatus for analyzing a reception signal obtained by a target object detecting apparatus, and recognizing whether a structure exists that significantly generates a clutter signal, such as a steel tunnel.

Also, according to an embodiment of the present invention, there is provide a method and apparatus for recognizing a structure that may significantly generate a clutter signal, and for enhancing a target detecting performance for improving safety in a section where the corresponding structure is installed.

BRIEF DESCRIPTION OF THE DRAWINGS

The above and other objects, features, and advantages of the present invention will be more apparent from the following detailed description taken in conjunction with the accompanying drawings, in which:

FIG. 1 is a diagram illustrating the deterioration of a detection performance of a target signal due to a clutter structure;

DETAILED DESCRIPTION OF THE EXEMPLARY EMBODIMENTS

Figure 2:
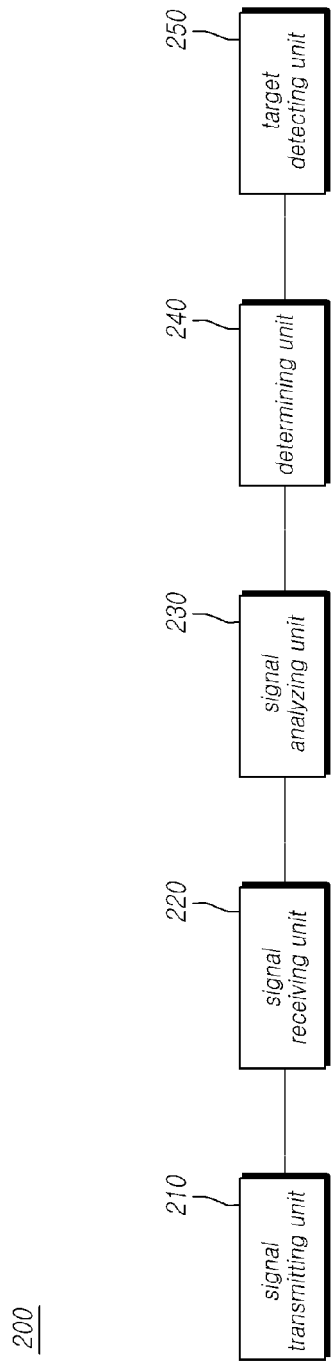
FIG. 2 is a diagram illustrating a configuration of a target object detecting apparatus according to an embodiment of the present invention.

Hereinafter, aspects of the present invention will be described in detail with reference to the accompanying drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

The present invention discloses a target object detecting apparatus and a target object detecting method.

As a vehicle-mounted radar has become popular, various functions for driver's convenience using the same have been developed. An adaptive cruise control (ACC) function is one example of the convenient functions, which automatically maintains a safety distance from a forward target vehicle and automatically controls the vehicle's speed or steering.

However, to enable the function to be normally performed and to provide convenience for a driver, high reliability may be required from a radar device that may continuously detect and track a forward vehicle. In the case of heavy rain or fog that causes bad visibility, the radar device may have higher reliability than other sensors, such as a camera or the like. However, in the situation in which various steel structures of roads exist, a reflective signal increases, and thus, a performance of detecting a target object may deteriorate.

To solve the drawback, there is provided a target object detecting apparatus and a target object detecting method that may promptly and accurately detect a target object by applying a signal processing technology even in an environment having a large number of clutter structures.

In the radar technology, a clutter indicates a reflective obstacle, such as echo or the like caused by an unnecessary reflective wave that is generated from the ground, the surface of the sea, raindrops, or the like. In the present specification, a clutter structure indicates an object that causes a clutter, and a clutter signal is a signal component that a radar receives due to an unnecessary reflective wave. A clutter signal is distinguished from a noise signal, and may be received at a stronger intensity than a target signal by a target object, and thus, may cause a problem in detecting a target object.

Hereinafter, a clutter structure may indicate a structure existing on or around a road, which may generate a clutter signal when a radar signal is received.

FIG. 1 is a diagram illustrating the deterioration of a detection performance of a target signal due to a clutter structure.

Referring to FIG. 1, there may be a situation 100 in which a vehicle enters a steel tunnel while driving. In this instance, a target object detecting performance of a target object detecting apparatus may deteriorate due to a clutter signal generated by a steel tunnel in the situation in which a forward vehicle 110 is detected as a target object.

Therefore, when the vehicle enters the steel tunnel, a frequency spectrum 150 of a reception signal received by the target object detecting apparatus of the vehicle may include a plurality of clutter signals. Due to a plurality of clutter signal components, there may be difficulty in detecting a target signal 160 received from the forward vehicle 100. The drawback may become worse when a plurality of steel structures, which have high reflexibility with respect to a transmission signal, are disposed at regular intervals. Under the environment, in the state in which the frequency spectrum of the reception signal is as shown in the diagram 150, when a clutter signal component is suppressed by converting the frequency spectrum into a different dimension, a target signal component may be readily detected.

FIG. 2 is a diagram illustrating a configuration of a target object detecting apparatus according to an embodiment of the present invention.

The target object detecting apparatus 200 may include a signal transmitting unit 210 to transmit a transmission signal for detecting a target object, a signal receiving unit 220 to receive a reception signal that is generated due to a reflection of a transmission signal, a signal analyzing unit 230 to calculate the frequency spectrum information of a reception signal, and to extract periodicity information for determining periodicity of the frequency spectrum information, a determining unit 240 to determine whether a clutter structure exists; and a target detecting unit 250 to detect a target object by deleting a peak value component of periodicity information when it is determined that a clutter structure exists.

Referring to FIG. 2, the target object detecting apparatus 200 may include the signal transmitting unit 210 that transmits a transmission signal for detecting a target object. The transmission signal may be an RF signal having a frequency band for a radar signal. The target object detecting apparatus 200 may transmit a transmission signal in the forward direction or around a vehicle periodically or continuously, so as to detect a target object.

The target object detecting apparatus 200 may include the signal receiving unit 220 that receives a reception signal that is generated since a transmission signal is reflected. The reception signal indicates a signal that is received by a reception antenna after a transmission signal is reflected by a target or various neighboring objects that generate reflective waves. Therefore, the target object detecting apparatus 200 may periodically or continuously transmit a transmission signal, and may detect a target object using a reception signal, which is a reflective signal of the corresponding transmission signal. The target object detecting apparatus 200 may be various types of radar devices using a transmission/reception signal, and may not be limited by a type of transmission signal or reception signal, and a signal transmission/reception scheme. However, hereinafter, descriptions will be provided by assuming that a forward looking FMCW radar for 77 GHz long-range is used, for ease of description.

The target object detecting apparatus 200 may include the signal analyzing unit 230 that calculates frequency spectrum information of a reception signal, and extracts periodicity information for determining periodicity of the frequency spectrum information. The signal analyzing unit 230 may calculate frequency spectrum information of a reception signal. The frequency spectrum information may be calculated by performing Fourier transform on the reception signal. In this instance, a plurality of clutter signals may exist as shown in the diagram 150 of FIG. 1. Therefore, the signal analyzing unit 230 may extract periodicity information using the calculated frequency spectrum information. For example, the signal analyzing unit 230 may extract periodicity information by performing fast Fourier transform (FFT) on the frequency spectrum information. As another example, the signal analyzing unit 230 may calculate binary frequency spectrum information using frequency spectrum information and a binary reference value, and may extract periodicity information by performing FFT on the calculated binary frequency spectrum information. As another example, the signal analyzing unit 230 may calculate binary peak frequency spectrum information using frequency spectrum information and a binary reference value, and may extract periodicity information by performing FFT on the calculated binary peak frequency spectrum information. As another example, the signal analyzing unit 230 may extract periodicity information by performing inverse fast Fourier transform (IFFT) on frequency spectrum information. As another example, the signal analyzing unit 230 may extract periodicity information by taking a log of frequency spectrum information and performing FFT on the same. That is, the signal analyzing unit 230 may obtain a cepstrum of a reception signal, and may use the same as periodicity information. In addition, the signal analyzing unit 230 may extract periodicity information of a frequency spectrum by changing frequency spectrum information into a different domain. A method of changing into a different domain may include various methods, such as FFT, binary FFT, IFFT, and the like, which have been described, and may not be limited to a predetermined method.

The target object detecting apparatus 200 may include the determining unit 240 that determines whether a clutter structure exists. For example, the determining unit 240 may receive image information through a camera configured in a vehicle, or the like, and may determine whether a clutter structure exists in front of a driving direction of the vehicle. As another example, the determining unit 240 may determine whether a clutter structure exists in the forward direction by receiving road information. The road information may be obtained from a data reception device, such as a navigation contained in a vehicle, or may be obtained through map information stored in advance in a vehicle. As another example, the determining unit 240 may determine whether a clutter structure exists based on periodicity information. Particularly, the determining unit 240 may determine whether a clutter structure exists using a peak component included in the periodicity information. For example, when a peak component included in periodicity information appears at regular intervals, the determining unit 240 may determine that a clutter signal caused by a clutter structure is included in a reception signal. Therefore, the determining unit 240 may identify, using the periodicity information, the periodic expression of a peak component, which is not identified from frequency spectrum information, and may determine that a clutter signal is included in the corresponding reception signal using the periodicity information.

The target object detecting apparatus 200 may include the target detecting unit 250 that detects a target object by suppressing a peak value component of periodicity information when it is determined that a clutter structure exists. The target detecting unit 250 may suppress a peak value component of the periodicity information when it is determined that a clutter structure exists based on the periodicity information. Subsequently, the target detecting unit 250 may convert the periodicity information in which the peak value component is suppressed, into frequency spectrum information, and may detect a target object. A method in which the target detecting unit 250 converts periodicity information into frequency spectrum information may be performed in reverse order of the method of converting the frequency spectrum information into the periodicity information. For example, the target detecting unit 250 may convert the periodicity information in which the peak value component is suppressed into a frequency spectrum by performing IFFT on the periodicity information. As another example, the target detecting unit 250 may convert the periodicity information in which the peak value component is suppressed into a frequency spectrum by performing IFFT on the periodicity information and multiplying the same with an existing frequency spectrum. As another example, the target detecting unit 250 may convert the periodicity information in which the peak value component is suppressed into a frequency spectrum by performing FFT on the periodicity information. In addition, the target detecting unit 250 may apply various methods to convert a domain of the periodicity information into a frequency domain.

The target detecting unit 250 may detect a target object by using frequency spectrum information that is converted again after a peak value is suppressed in periodicity information. In this instance, the peak value component is suppressed in the periodicity information, a peak component caused by a clutter signal may be significantly suppressed in the frequency spectrum, and the target signal may be more easily detected. Therefore, in the situation where it is too difficult to detect a target signal using a frequency spectrum of a reception signal, the target detecting unit 250 may readily detect the target signal by suppressing a peak value component of periodicity information and analyzing a frequency spectrum.

Hereinafter, the above described operations will be described for each embodiment, and the embodiments will be described sequentially in detail based on a spectrum result.

Figure 3:
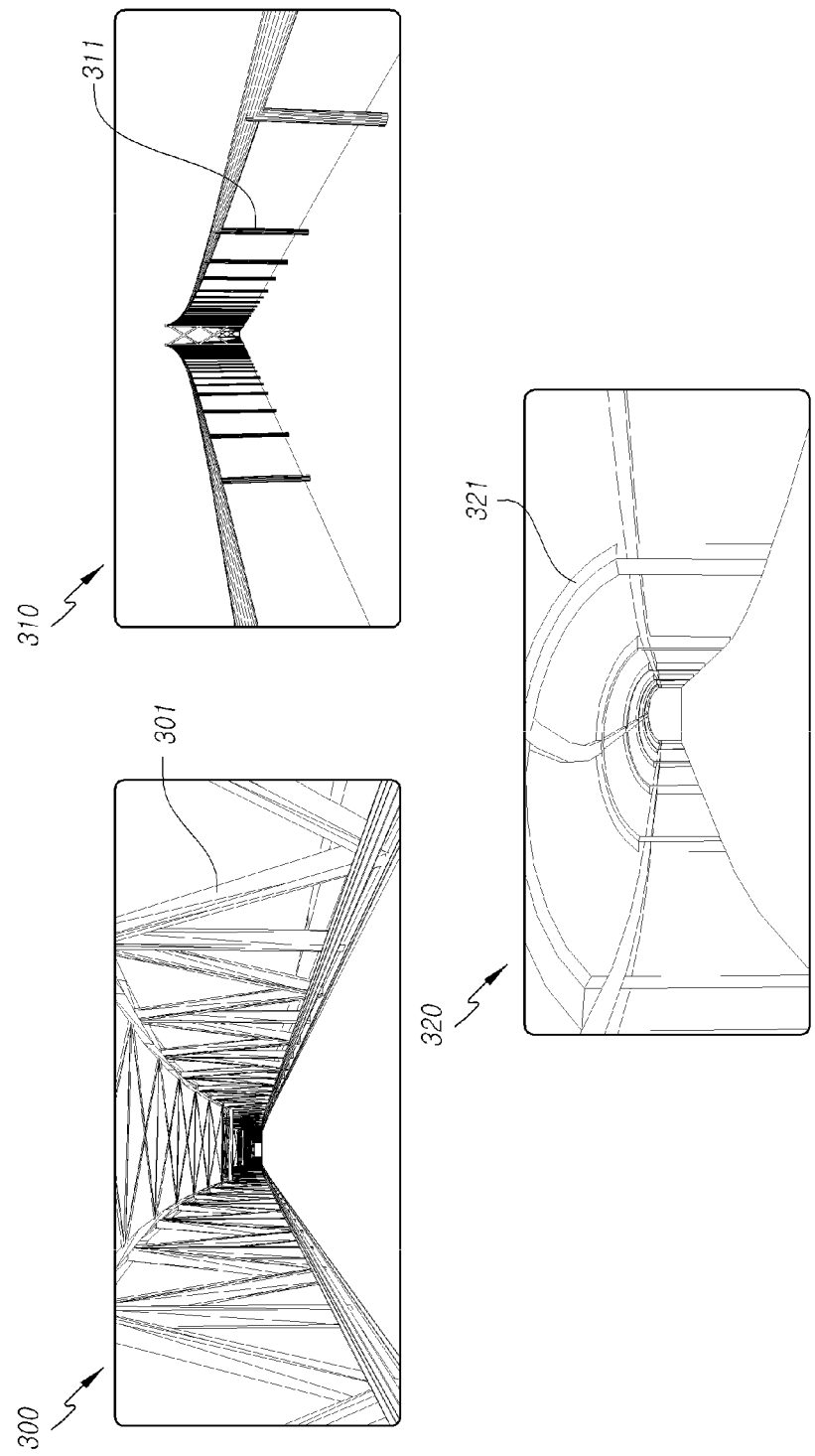
FIG. 3 is a diagram illustrating a clutter structure.

FIG. 3 is a diagram illustrating a clutter structure.

In the present specification, a clutter structure may include one or more of a steel tunnel, a steel soundproof wall, and a steel structure, which generate clutter signals. That is, the clutter structure may indicate a steel structure that may generate a plurality of reflective waves due to a transmission signal, and may indicate a steel tunnel installed on a road, a steel soundproof wall installed in one side or both sides of a road, or the like. Alternatively, the clutter stricture may be a structure formed of a different material, and the corresponding structure may indicate an object that generates a plurality of reflective waves and generates a clutter signal.

For example, when a vehicle drives through a steel bridge 300, steel columns 301 located in the left or the right side of the steel bridge 300, or on the steel bridge 300 may be a clutter structure. The steel column 301 has high reflexibility with respect to a transmission signal, and thus, may be a factor of generating a plurality of clutter signals. As another example, when a vehicle drives through a suspension bridge 310, a clutter signal may be generated by wire ropes 311 of the suspension bridge 310. As another example, when a vehicle drives through a steel tunnel 320, a clutter signal may be generated by steel columns 321 of the steel tunnel 320. As described above, the clutter structure may indicate a structure in which structures formed of a material (e.g., steel) having high reflexibility with respect to a transmission signal exist successively. For example, the steel columns 301 of the steel bridge 300, the steel wire rope 311 of the suspension bridge 310, the steel columns 321 of the steel tunnel 320, and the like successively exist at regular intervals, and may be a main factor that causes a clutter signal. Therefore, the present embodiments provide a method and apparatus for detecting only a target signal by removing a clutter signal caused by a clutter structure even in an environment where a target object and the clutter structure coexist.

A signal analyzing unit may calculate frequency spectrum information of a reception signal that includes a clutter signal, a target signal, and a noise signal together. For example, in the case of an FMCW radar, a method of calculating frequency spectrum information using a reception signal is as follows.

A signal received for each channel after a signal transmitted from the FMCW radar is reflected by L targets, may be defined by Equation 1 as provided below.

$$S_k(t) = \sum_{i=0}^{L-1} A_k(i)\cos(2\pi f(i)t + \phi_k(i)).$$ [Equation 1]

$A_k(i)$ denotes a magnitude (amplitude) of a signal reflected by each target. f(i) denotes a sum or subtraction of $f_r(i)$ and $f_d(i)$. $f_r(i)$ is a difference in frequency based on a distance, and $f_d(i)$ is generated by a relative speed, which are calculated by Equation 2 and Equation 3, respectively. f(i) may be determined to be a sum or a subtraction of $f_r(i)$ and $f_d(i)$ according to up-chrip or down-chirp of a signal.

$$f_r(i) = \frac{2B}{cT}R(i)$$ [Equation 2]

$$f_d(i) = \frac{2f_c}{c}V_r(i) = \frac{2}{\lambda}V_r(i)$$ [Equation 3]

Here, B denotes a bandwidth. T denotes a duration of chirp. c denotes a speed of light. $f_c$ denotes a center frequency. R(i) and $V_r(i)$ denote a distance and a relative speed, respectively. Also, $\varphi_k(i)$ denotes a phase component for each channel of a reception signal.

$S_k(n)$ is a discrete-time signal of $S_k(t)$, and may be expressed as Equation 4.

$$S_k(n) = \sum_{i=0}^{L-1} A_k(i)\cos(2\pi f(i)n + \phi_k(i))$$ [Equation 4]

Here, n denotes a discrete-time index of a reception signal during a single scan, and N denotes the total number of samples of a reception signal during a single scan.

When short-time Fourier transform (SIFT) or FFT is performed on the reception signal, this may be expressed as Equation 5.

$$S_k(f, m) = \sum_{i=0}^{N-1} S_k(n + (m-1) \cdot N)e^{-j\frac{2\pi f}{N}n}$$ [Equation 5]

Here, f denotes a frequency index, and m denotes a scan index.

A magnitude response, to which a frequency domain signal for each reception channel is added, may be obtained as shown in Equation 6.

$$P(f, m) = \left|\sum_{k=0}^{K-1} S_k(f, m)\right|$$ [Equation 6]

As described above, the signal analyzing unit may calculate frequency spectrum information using a reception signal. In the above descriptions, the example of calculating frequency spectrum information has been described. However, various pieces of frequency-related response information, such as frequency response information or the like, may be calculated. A method of calculating frequency spectrum information may not be limited.

Figure 4:
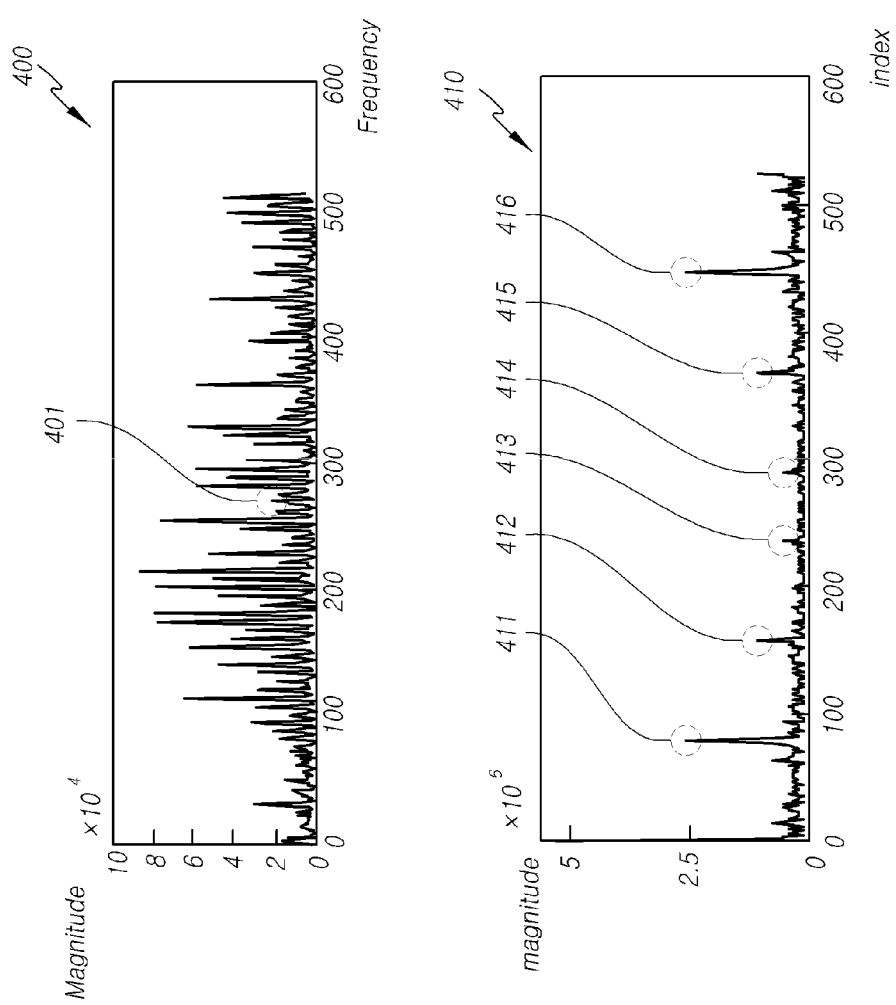
FIG. 4 is a diagram illustrating periodicity information extracted through fast Fourier transform (FFT) according to an embodiment of the present invention.

FIG. 4 is a diagram illustrating periodicity information extracted through fast Fourier transform (FFT) according to an embodiment of the present invention.

A signal analyzing unit may extract periodicity information by performing FFT on frequency spectrum information.

Referring to FIG. 4, a frequency spectrum 400 associated with a reception signal includes a plurality of peak values due to a clutter signal. Therefore, it may be difficult to detect a target signal 401 through the analysis of the frequency spectrum 400 in the situation in which a clutter structure exists. That is, it is difficult to detect a target object due to a plurality of peak values having a large magnitude than a target signal. To overcome the above, the signal analyzing unit may extract periodicity information 410 by performing FFT on the frequency spectrum 400. In the present specification, the X axis and the Y axis of periodicity information are expressed as indices, respectively. A unit or the like may be variously changed according to a signal processing method for extracting the periodicity information. The periodicity information 410 extracted through FFT includes a plurality of peak value components 411, 412, 413, 414, 415, and 416. The signal analyzing unit may extract the periodicity information 410 using the frequency spectrum 400, and a determining unit may determine whether a peak value component 411, 412, 413, 414, 415, and 416 of the periodicity information 410 appears at regular intervals, and may determine the existence of a clutter structure. The diagram 410 illustrates periodicity information when a clutter structure exists.

Figure 5:
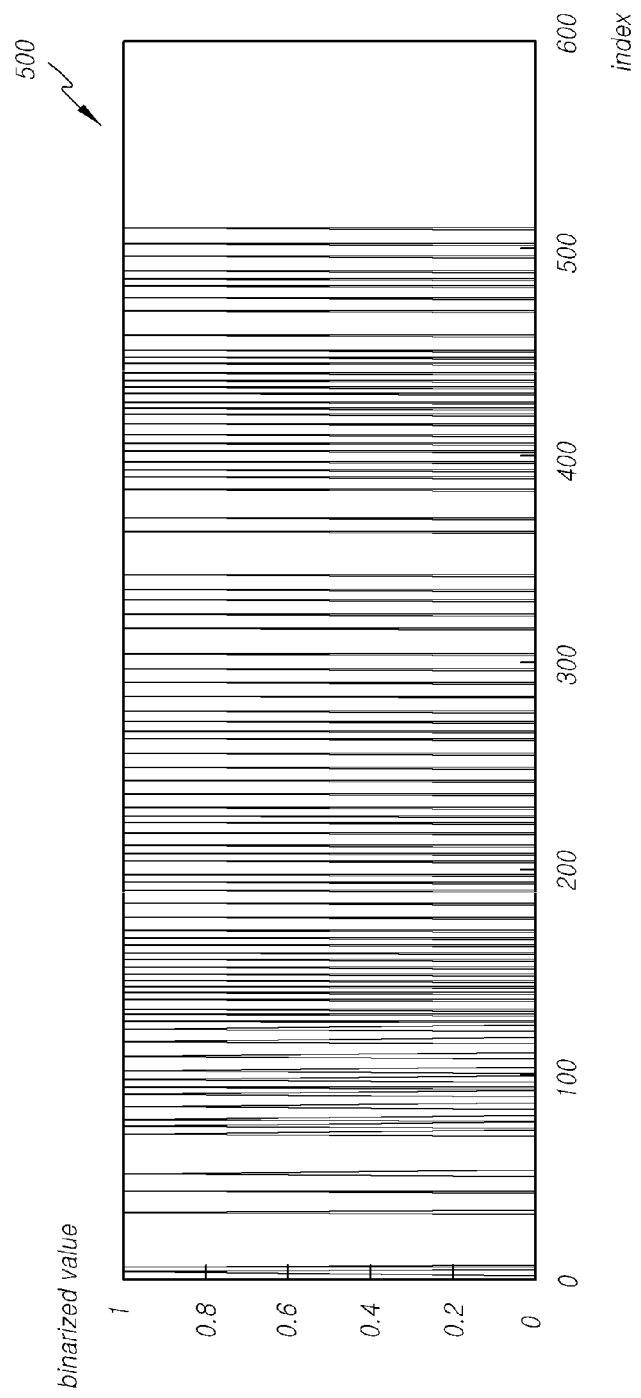
FIG. 5 is a diagram illustrating a binary frequency spectrum according to an embodiment of the present invention.
Figure 6:
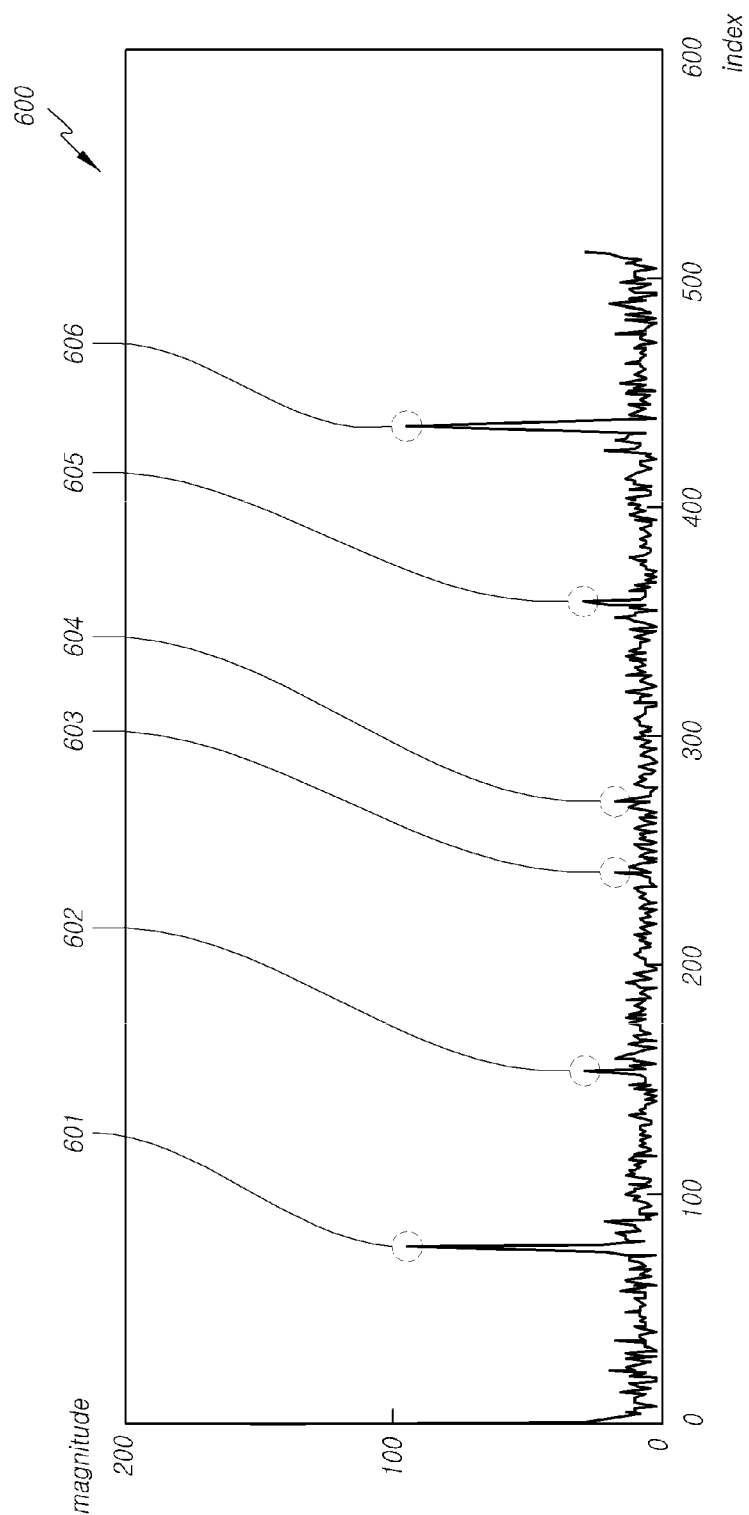
FIG. 6 is a diagram illustrating periodicity information extracted using a binary frequency spectrum according to an embodiment of the present invention.

FIG. 5 is a diagram illustrating a binary frequency spectrum according to an embodiment of the present invention. FIG. 6 is a diagram illustrating periodicity information extracted using a binary frequency spectrum according to an embodiment of the present invention.

Referring to FIG. 5, a signal analyzing unit may calculate binary frequency spectrum information 500 obtained by converting frequency spectrum information into a value of 0 or 1 based on a predetermined binary reference value, and may extract periodicity information by performing FFT on the binary frequency spectrum information 500. For example, the signal analyzing unit may generate the binary frequency spectrum information 500 by converting a frequency component that is greater than or equal to the binary reference value into 1, and converting a frequency component that is less than the binary reference value into 0, based on the frequency spectrum information and the predetermined binary reference value. FIG. 5 illustrates an example of binarizing the frequency spectrum information 400 of FIG. 4 using a binary reference value of 10000.

The signal analyzing unit may extract periodicity information by performing FFT on the binary frequency spectrum information 500. Referring to FIG. 6, the signal analyzing unit may determine periodicity information 600 obtained by performing FFT on the binary frequency spectrum information 500 of FIG. 5. In this instance, when the frequency spectrum information 400 is binarized into values of 0 and 1, the magnitude is regular, and thus, it is easy to determine the period of a peak value component 601, 602, 603, 604, 605, and 606 from the periodicity information 600.

Figure 7:
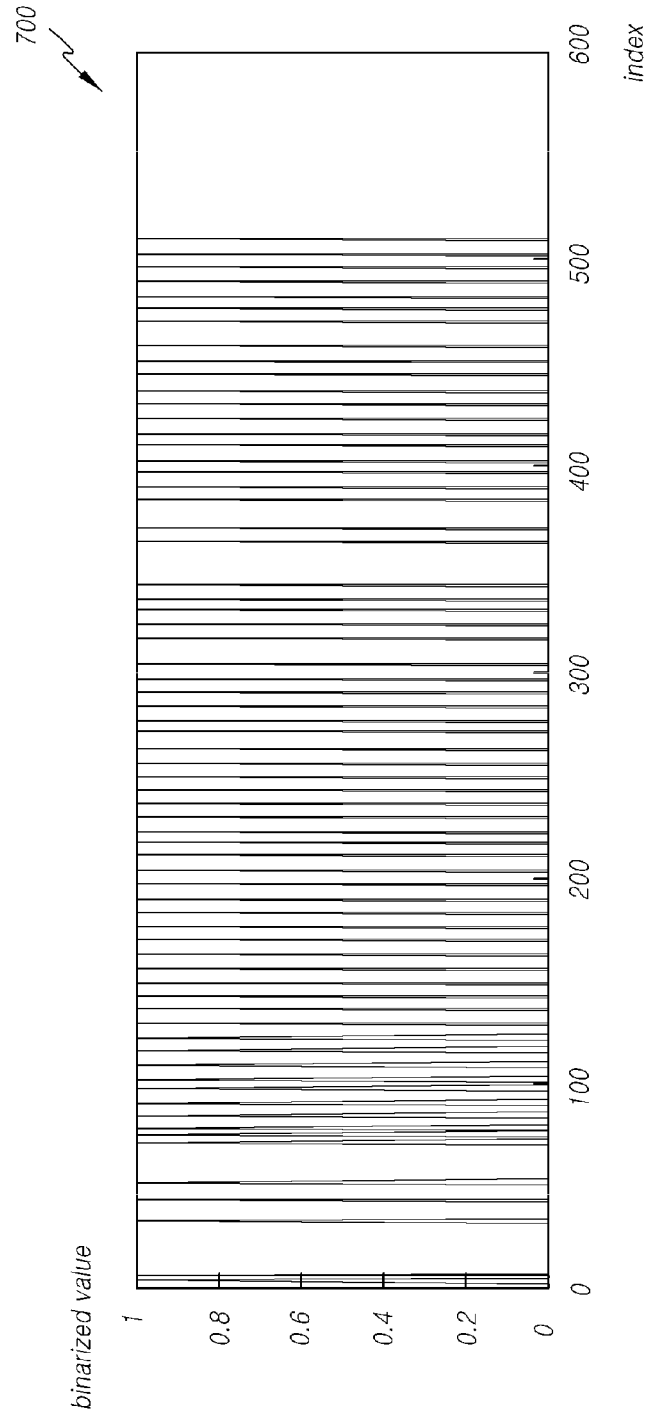
FIG. 7 is a diagram illustrating a binary peak frequency spectrum according to an embodiment of the present invention.

FIG. 7 is a diagram illustrating a binary peak frequency spectrum according to an embodiment of the present invention.

A signal analyzing unit may calculate binary peak frequency spectrum information obtained by converting a peak component of frequency spectrum information into a value of 0 or 1 based on a predetermined binary reference value, and may extract periodicity information by performing FFT on the binary peak frequency spectrum information.

Referring to FIG. 7, the signal analyzing unit may calculate binary peak frequency spectrum information 700 by converting the frequency spectrum information 400 of FIG. 4 into values of 0 and 1 based on a binary reference value and whether a corresponding component corresponds to a peak. For example, the signal analyzing unit may compare the frequency spectrum information 400 and the binary reference value, and may convert, into 1, only a peak component out of the components having magnitudes greater than or equal to the binary reference value. The value of a peak component having a magnitude less than the binary reference value may be converted into 0. Also, all of the values of the frequency spectrum information 400, which are not peaks, may be converted into 0. In this instance, when compared to the binary frequency spectrum information 500 of FIG. 5, the number of indices having a value of 1 may be smaller. FIG. 7 illustrates an example of binarizing the frequency spectrum information 400 of FIG. 4 using a binary reference value of 10000.

Figure 8:
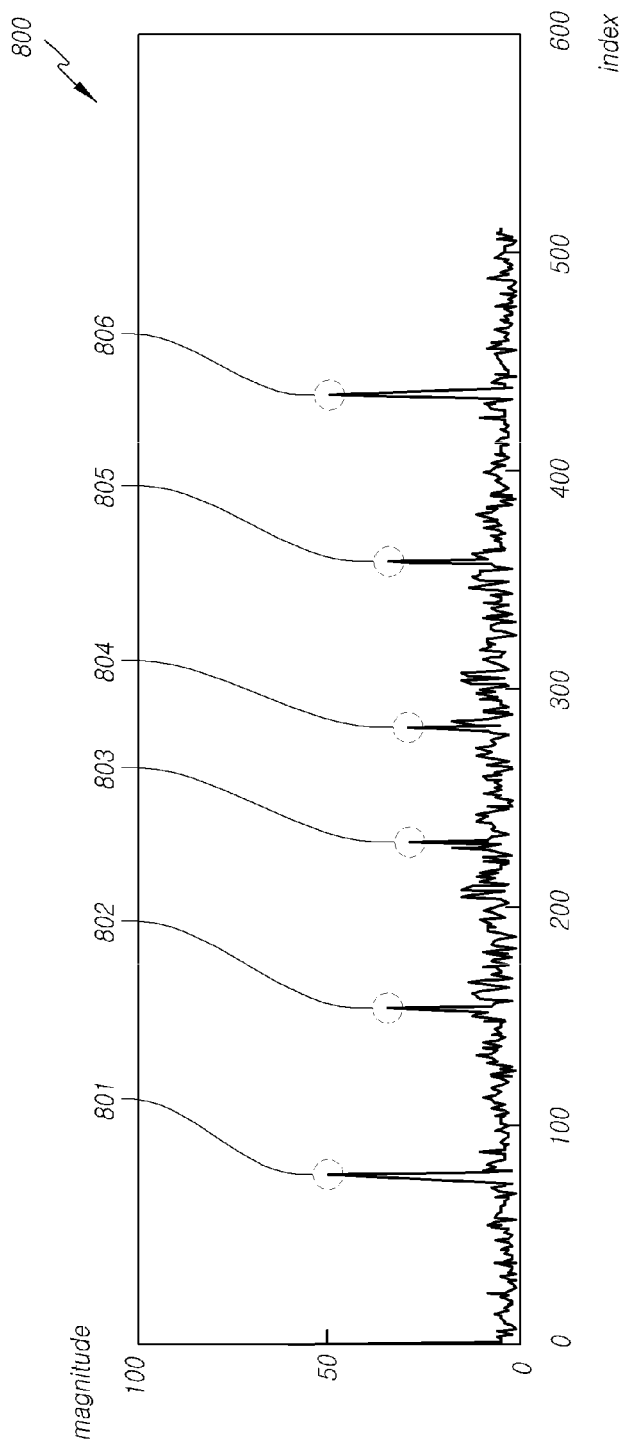
FIG. 8 is a diagram illustrating periodicity information extracted using a binary peak frequency spectrum according to an embodiment of the present invention.

FIG. 8 is a diagram illustrating periodicity information extracted using a binary peak frequency spectrum according to an embodiment of the present invention.

Referring to FIG. 8, a signal analyzing unit may extract periodicity information 800 by performing FFT on the binary peak frequency spectrum information 700 of FIG. 7. It is identified that a peak value component 801, 802, 803, 804, 805, and 806 is periodically generated in a regular interval range from the periodicity information 800 extracted by performing FFT on the binary peak frequency spectrum information 700. A determining unit may determine that a clutter signal is included in a corresponding reception signal when the peak value component 801, 802, 803, 804, 805, and 806 of the periodicity information 800 appears periodically in a regular interval range.

Figure 9:
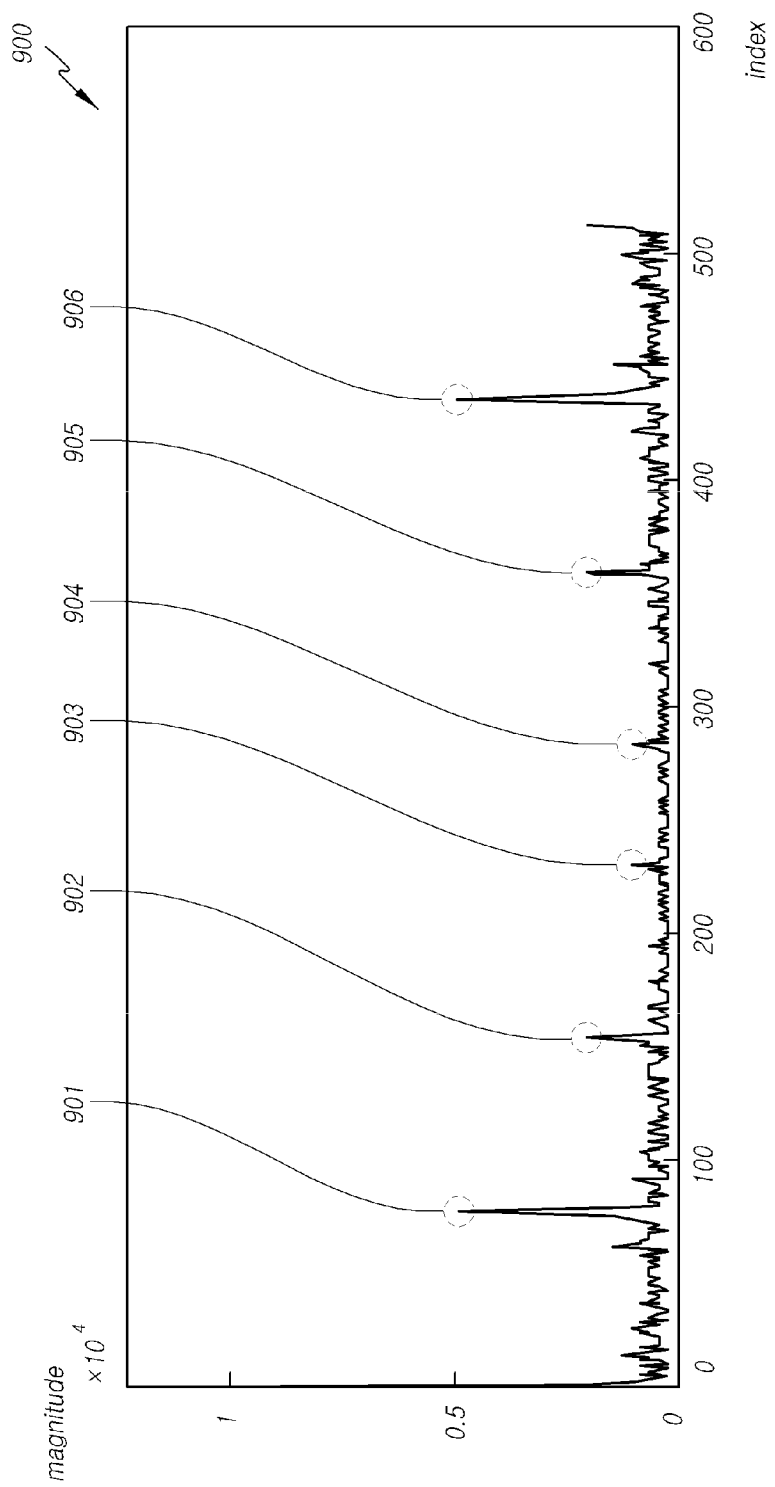
FIG. 9 is a diagram illustrating periodicity information extracted through inverse fast Fourier transform (IFFT) according to an embodiment of the present invention.

FIG. 9 is a diagram illustrating periodicity information extracted through inverse fast Fourier transform (IFFT) according to an embodiment of the present invention.

A signal analyzing unit may extract periodicity information by performing IFFT on frequency spectrum information.

Referring to FIG. 9, the signal analyzing unit may extract periodicity information 900 by performing IFFT on frequency spectrum information. For example, the signal analyzing unit may extract the periodicity information 900 by obtaining a magnitude response through performing IFFT on frequency spectrum information of which a magnitude response is obtained by performing FFT on a reception signal. In this instance, it is identified that a peak value component 901, 902, 903, 904, 905, and 906 of the periodicity information 900 appears periodically in a regular interval range.

As described above, the signal analyzing unit may extract periodicity information through various signal processing methods using frequency spectrum information of a reception signal.

When a peak value component of periodicity information is generated periodically in a regular interval range, the determining unit may determine that a clutter structure exists. For example, when periodicity information of FIG. 4, FIG. 6, FIG. 8, and FIG. 9 is extracted, the determining unit may determine whether a clutter structure exists by determining whether a peak value component of the extracted periodicity information is generated in a regular interval range. That is, when the peak value component of the periodicity information exists in a regular interval range, the determining unit may determine that a clutter signal is included in a reception signal, and determines that a clutter structure exists. Conversely, when a peak value component, which appears to be relatively larger than neighboring values, does not exist in the periodicity information, or is not generated periodically in a regular interval range, the determining unit may determine that a clutter structure does not exist.

For example, the periodicity information may include a peak value component that is periodically generated in a regular interval range, and when a peak value component that is periodically generated exists, it is determined that a clutter signal is included. In this instance, a peak value component in the periodicity information may not be generated at regular intervals. Accordingly, when a peak value component exists in a predetermined regular interval range, it is determined that the peak value component is periodically generated. Regarding a peak value in the periodicity information, only a peak that exceeds a predetermined reference value may be extracted, or a peak may be extracted by determining whether a peak exists that is at least a predetermined magnitude greater than the average of neighboring magnitude values. That is, a peak value that exceeds the predetermined reference value may be extracted as a peak value for determining periodicity, and whether the corresponding peak value is generated periodically may be determined. Alternatively, the magnitude of each peak value and the average of neighboring peak values may be compared, and a peak value having a difference greater than or equal to a predetermined value may be extracted. Whether the corresponding peak value is periodically generated may be determined.

As another example, the determining unit may determine whether a clutter structure exists based on whether a peak value exists in periodicity information. For example, the determining unit may determine whether a peak value component that exceeds a predetermined reference magnitude is included in periodicity information, and may determine whether a clutter structure exists. That is, even in the case in which a peak value component exists in the periodicity information, when the magnitude of the corresponding peak value component does not exceed the reference magnitude, the determining unit may determine that a clutter structure does not exist. Alternatively, the determining unit may determine whether a clutter structure exists based on only whether a peak value component exists in a predetermined index section for reducing a processing time of the periodicity information. That is, the determining unit may check only the predetermined index section out of the periodicity information, may determine whether a peak value component that exceeds the predetermined reference magnitude exists in the predetermined index section, and may determine whether a clutter structure exists. In this instance, a processing time expended for determining a peak value component with respect to all indices may be prevented from being wasted. The predetermined index section may be set using at least one of an upper bound and a lower bound, such as X~Y (X and Y are real numbers greater than 0) or 0~Y (Y is a real number greater than 0).

In an embodiment associated with determining whether a clutter structure exists in the present specification, examples of determining whether a clutter structure exists using periodicity information may be applied as occasion arises.

Figure 10:
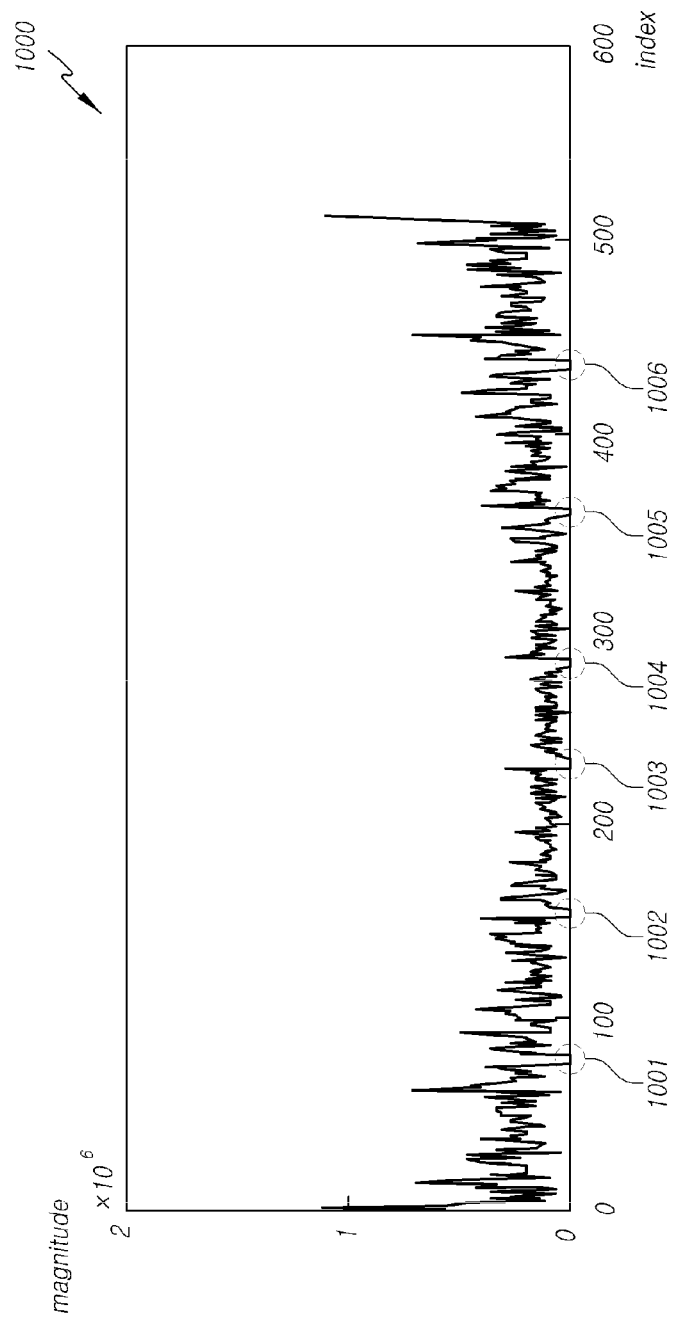
FIG. 10 is a diagram illustrating a spectrum of which a peak component is suppressed in periodicity information according to an embodiment of the present invention.

FIG. 10 is a diagram illustrating a spectrum of which a peak component is suppressed in periodicity information according to an embodiment of the present invention.

A target detecting unit may extract a target signal reflected by a target object by suppressing a peak value component that is greater than a predetermined peak reference value in periodicity information, and converting periodicity information in which the peak value component is suppressed into conversion frequency spectrum information.

Referring to FIG. 10, the target detecting unit may suppress a peak value component that is periodically generated in periodicity information, and may calculate periodicity information 1000 in which the peak value component is suppressed. The target detecting unit may calculate the periodicity information 1000 in which a peak value component is suppressed by changing a peak value selected for determining periodicity into 0. Alternatively, the target detecting unit may suppress a peak value component by changing a peak value selected for determining periodicity into a magnitude of a neighboring index, or the average of magnitudes of neighboring indices. FIG. 10 illustrates an example of calculating the periodicity information 1000 in which a peak value component is suppressed by converting a peak value 1001, 1002, 1003, 1004, 1005, and 1006 of the periodicity information 410 of FIG. 4 into 0.

Figure 11:
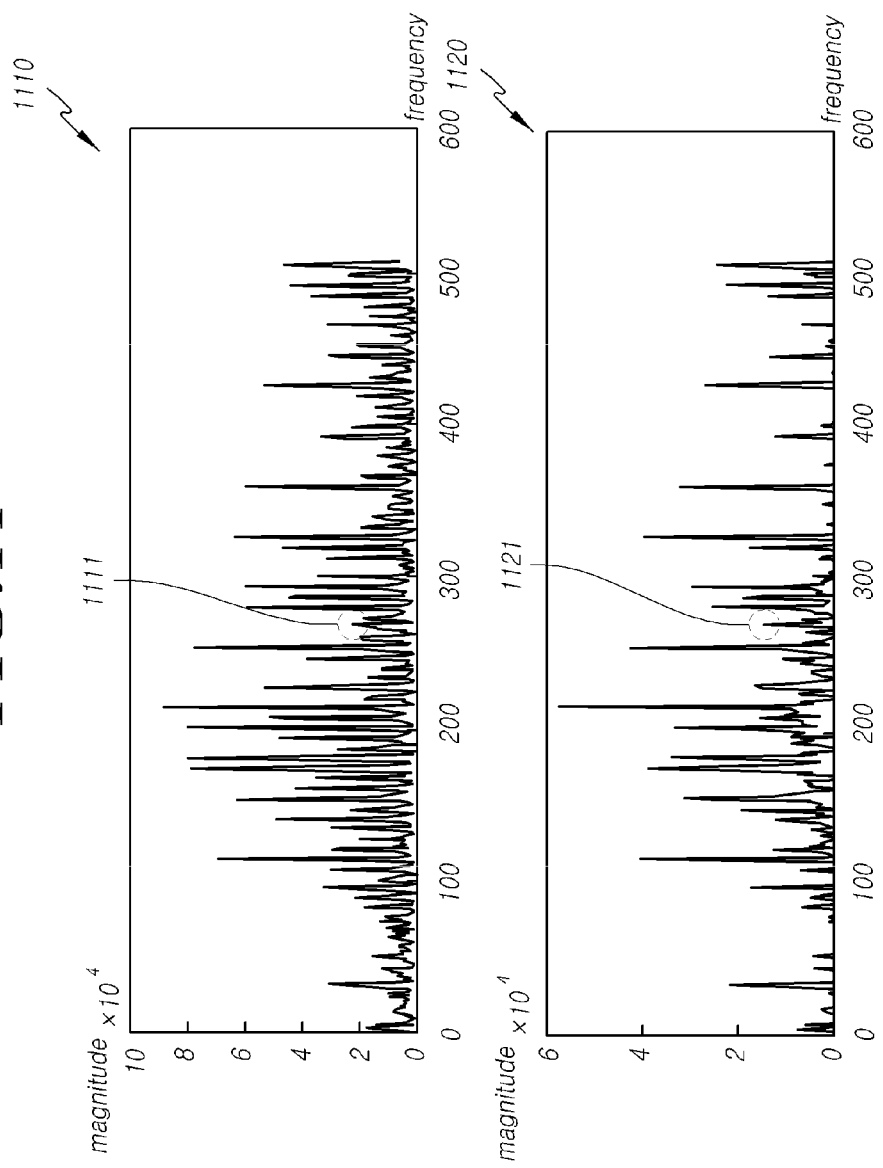
FIG. 11 is a diagram illustrating a comparison between a frequency spectrum of a reception signal and a conversion frequency spectrum obtained through conversion after suppressing a peak component, on an embodiment of the present invention.

FIG. 11 is a diagram illustrating a comparison between a frequency spectrum of a reception signal and a conversion frequency spectrum obtained through conversion after suppressing a peak component, according to an embodiment of the present invention.

The target detecting unit may extract a target signal reflected by a target object by converting the periodicity information in which a peak value component is suppressed into conversion frequency spectrum information. In this instance, a method of converting periodicity information in which a peak value component is suppressed into a conversion frequency spectrum may be changed based on a periodicity information extracting method.

Figure 12:
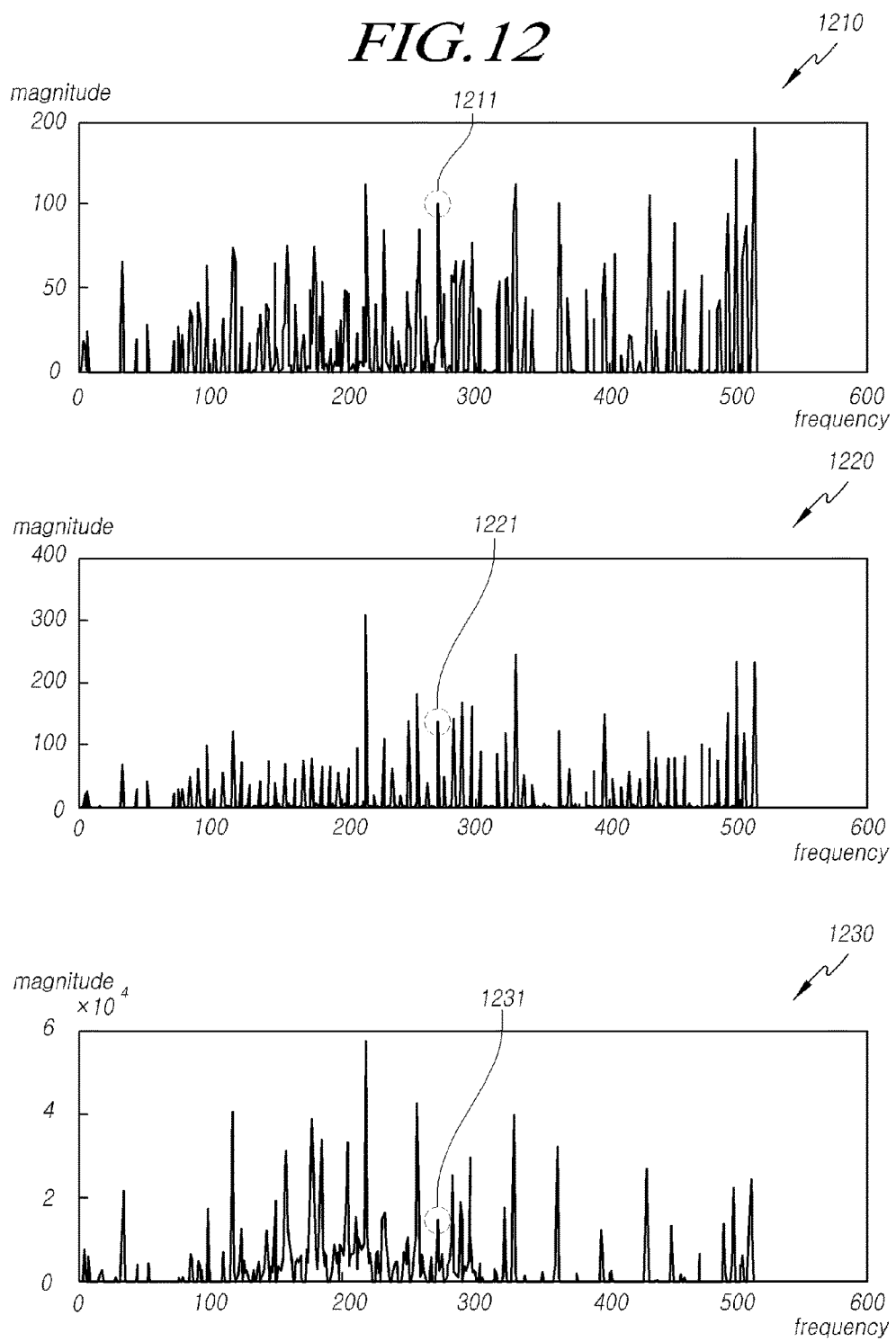
FIG. 12 is a diagram illustrating various examples of conversion frequency spectrums obtained through conversion after suppressing a peak component according to an embodiment of the present invention.

For example, when periodicity information is extracted by performing FFT on frequency spectrum information, the target detecting unit may calculate conversion frequency spectrum information 1120 by performing IFFT on periodicity information in which a peak value component is suppressed. In this instance, since the peak value component is suppressed in the periodicity information, the conversion frequency spectrum information may be different from the frequency spectrum information calculated using a reception signal. Referring to FIG. 11, a difference between original frequency spectrum information 1110 of a reception signal and the conversion frequency spectrum information 1120 obtained through conversion after suppressing a peak value component may be determined. That is, there is difficulty in detecting a target signal 1111 from the original frequency spectrum information 1110 due to a plurality of clutter signals. However, it is easier to detect a peak 1121 of a target signal from the conversion frequency spectrum information 1120 due to a peak value component that is suppressed in periodicity information. As described above, the conversion frequency spectrum information may enable a target signal to be easily detected when a clutter signal exists. FIG. 11 illustrates the original frequency spectrum information 1110 and the conversion frequency spectrum information 1120 when FFT is used for extracting periodicity information. Hereinafter, conversion frequency spectrum information according to each periodicity information extracting method will be described with reference to FIG. 12.

As another example, when periodicity information is extracted using binary frequency spectrum information, the target detecting unit may perform IFFT on periodicity information in which a peak value component is suppressed, and multiplying (weighting) the same with the original frequency spectrum information, so as to calculate the conversion frequency spectrum information 1210. Particularly, the target detecting unit may suppress a peak value component in the periodicity information extracted using the binary frequency spectrum information, and may perform IFFT using the periodicity information in which the peak value component is suppressed. Subsequently, the target detecting unit may multiply the spectrum to which IFFT is performed with the original frequency spectrum generated using the reception signal, so as to calibrate a binary value, thereby calculating the conversion frequency spectrum information 1210. It is identified that a peak 1211 of a target signal is clearly detected from the conversion frequency spectrum information 1210.

As another example, when periodicity information is extracted using binary peak frequency spectrum information, the target detecting unit may perform IFFT on periodicity information in which a peak value component is suppressed, and multiplying (weighting) the same with the original frequency spectrum information, thereby calculating conversion frequency spectrum information 1220. In the same manner as the case that uses a binary frequency spectrum, the target detecting unit may suppress a peak value component in the periodicity information extracted using the binary peak frequency spectrum information, and may perform IFFT using the periodicity information in which the peak value component is suppressed. Subsequently, the target detecting unit may multiply the spectrum to which IFFT is performed with the original frequency spectrum generated using the reception signal, so as to calibrate a binary value, thereby calculating the conversion frequency spectrum information 1220. It is identified that a peak 1221 of a target signal is clearly detected from the conversion frequency spectrum information 1220. Also, it is identified that a smaller number of peaks caused by a clutter signal is detected in the conversion frequency spectrum information 1220, when compared to the original frequency spectrum information 1210.

As another example, when periodicity information is extracted by performing IFFT on frequency spectrum information, the target detecting unit may calculate conversion frequency spectrum information 1230 by performing FFT or IFFT on periodicity information in which a peak value component is suppressed. Particularly, the target detecting unit may suppress a peak value component in the periodicity information extracted by performing IFFT on the frequency spectrum information, and may perform FFT or IFFT using the periodicity information in which the peak value component is suppressed. The target detecting unit may detect a target object using a target signal peak 1231 in the conversion frequency spectrum information 1230 calculated through the above described process.

As described above, the target detecting unit may suppress a peak value component that is periodically generated in the periodicity information, and may convert the periodicity information into a frequency domain, thereby readily detecting a target signal when compared to the original frequency spectrum. That is, a target signal may be readily detected even when a clutter signal included.

When the determining unit determines that a clutter structure does not exist, the target detecting unit may detect a target object using a frequency spectrum of a reception signal. That is, the target detecting unit may use different reference spectrums for detecting a target signal based on whether a clutter structure exists or not. For example, based on a determination result of the determining unit, the target detecting unit may detect a target signal using an original frequency spectrum without using periodicity information, or may detect a target signal using a conversion frequency spectrum that is converted through the above mentioned method. Through the above, conversion frequency spectrum information may be prevented from being unnecessarily generated.

Alternatively, the target detecting unit may detect a target signal by generating a conversion frequency spectrum, irrespective of the existence of a clutter structure. For example, when it is determined that a clutter structure exists, the target detecting unit may detect a target signal using conversion frequency spectrum information. Also, even when it is determined that a clutter structure does not exist, the target detecting unit may detect a target signal using conversion frequency spectrum information.

Alternatively, when a clutter structure does not exist, the target detecting unit may detect a target signal using both original frequency spectrum information and conversion frequency spectrum information. For example, when a clutter structure exists, the target detecting unit may detect a target signal using conversion frequency spectrum information. When a clutter structure does not exist, the target detecting unit may detect a target signal using original frequency spectrum information, and may determine the reliability of the target signal using conversion frequency spectrum information to improve the reliability of the detected target signal.

The target detecting unit may detect a target signal using a detection threshold value together with original frequency spectrum information or conversion frequency spectrum information. The target detecting unit may use detection threshold value information to detect a target signal from a noise signal or the like. That is, the target detecting unit may detect a signal as a target signal that is different from noise, only when the signal intensity for each frequency exceeds a detection threshold value by setting the detection threshold value.

In this instance, when a plurality of clutter signals exist as illustrated in the present embodiments, the target detecting unit may have difficulty in detecting a corresponding target object when a target signal is detected to be smaller than a clutter signal. When it is determined that a clutter structure exists, the target detecting unit may detect a target object by adjusting a detection threshold value so that a target signal is detected.

In the embodiments, a detection threshold value may be fixed, may be a value that changes based on settings, or may be a value that is dynamically calculated by taking into consideration the intensity of a neighboring frequency or the like.

The target detecting unit may correct a detection threshold value, and may detect a final target object using an adaptive algorithm that detects a target. For example, a constant false alarm rate (CFAR) or the like may be used as the adaptive algorithm for detecting a target. In addition, various algorithms that detect a target object based on a reception signal against a background noise, such as noise, clutter, interference, or the like.

When it is determined that a clutter structure exists, the target detecting unit may correct a detection threshold value calculate parameter to lower a detection threshold value when calculating the detection threshold value for detecting a target object.

The target detecting unit may determine whether a clutter structure exists based on the determination result of the determining unit, and when it is determined that a clutter structure does not exist, the determining unit may detect a target signal using a predetermined existing detection threshold value. When it is determined that a clutter structure exists, the target detecting unit may correct a parameter for adjusting the detection threshold value. Subsequently, the target detecting unit may calculate the detection threshold value using the corrected parameter. The detection threshold value may be calculated using various algorithms for detecting a target signal when the target signal is received with an intensity greater than or equal to the detection threshold value in order to remove noise or the like. For example, in the CFAR algorithm or the like that determines a detection threshold value using intensity information of a neighboring frequency, a parameter for determining the detection threshold value may be corrected to a predetermined value so that the detection threshold value may be lowered. Through the above, a target signal may be detected even when a clutter signal is received intensively.

The target detecting unit may detect a peak signal that exceeds a threshold value using the determined detection threshold value. In this instance, the detection threshold value may be lower than a target signal, and thus, a target signal and a plurality of clutter signals may be detected.

The target detecting unit may detect a final target object using one or more detected peak signals. For example, a target object may be a forward vehicle, which is a moving object. A clutter signal is generated by a steel tunnel or the like, which is a stationary object. Therefore, a target object, which is a moving object, may be finally detected through an algorithm, such as filtering of a detected peak signal, or the like.

Hereinafter, a target object detecting method will be briefly described again according to the embodiments that have been described with reference to FIGS. 1 to 12.

Figure 13:
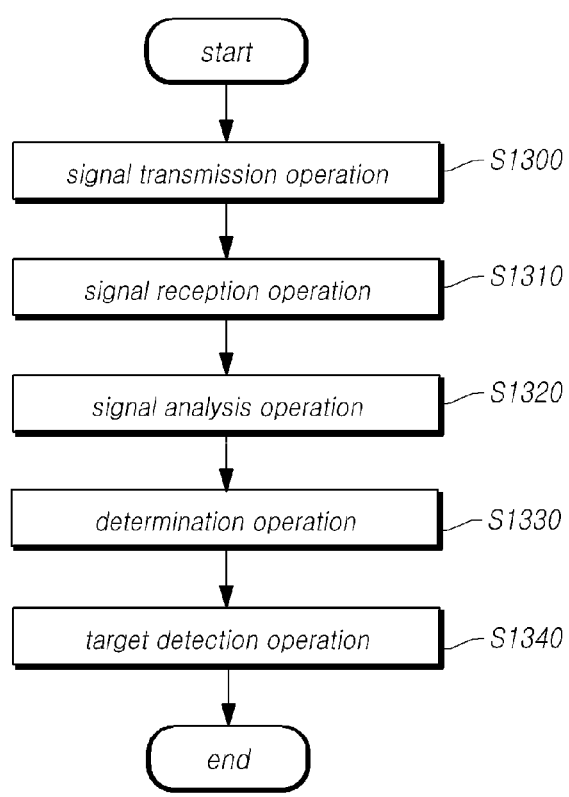
FIG. 13 is a flowchart illustrating a target object detecting method according to an embodiment of the present invention.

FIG. 13 is a flowchart illustrating a target object detecting method according to an embodiment of the present invention.

According to an embodiment, the target object detecting method may include a signal transmission operation to transmit a transmission signal for detecting a target object, a signal reception operation to receive a reception signal that is generated by a reflection of the transmission signal, a signal analysis operation to calculate frequency spectrum information of the reception signal, and to extract periodicity information for determining periodicity of the frequency spectrum information, a determination operation to determine whether a clutter structure exists, and a target detection operation to detect a target object by suppressing a peak value component of the periodicity information when it is determined that a clutter structure exists.

Referring to FIG. 13, the target object detecting method may include signal transmission operation S1300 that transmits a transmission signal for detecting a target object. The transmission signal may be an RF signal having a frequency band for a radar signal. The transmission operation may detect a target object by transmitting a transmission signal in the forward direction or around a vehicle periodically or continuously.

Also, the target object detecting method may include signal reception operation S1310, which receives a reception signal that is generated by the reflection of the transmission signal. The reception signal indicates a signal that is received by a reception antenna after the transmission signal is reflected by a target or various neighboring objects that generate reflective waves. Therefore, the reception operation may receive a signal that is generated when the transmission signal is reflected by a target or a neighboring structure. The type of transmission signal or reception signal, and a signal transmission/reception scheme may not be limited.

The target object detecting method may include signal analysis operation S1320 that calculates frequency spectrum information of the reception signal, and extracts periodicity information for determining periodicity of the frequency spectrum information. The signal analysis operation calculates the frequency spectrum information of the reception signal. The frequency spectrum information may be calculated by performing Fourier transform on the reception signal. In this instance, the reception signal received in the state in which a plurality of clutter structures exist may include a clutter signal associated with a clutter structure. The signal analysis operation may extract the periodicity information using the calculated frequency spectrum information. For example, the signal analysis operation may extract periodicity information by performing fast Fourier transform (FFT) on frequency spectrum information. As another example, the signal analysis operation may calculate binary frequency spectrum information using frequency spectrum information and a binary reference value, and may extract periodicity information by performing FFT on the calculated binary frequency spectrum information. As another example, the signal analysis operation may calculate binary peak frequency spectrum information using frequency spectrum information and a binary reference value, and may extract periodicity information by performing FFT on the calculated binary peak frequency spectrum information. As another example, the signal analysis operation may extract periodicity information by performing inverse fast Fourier transform (IFFT) on frequency spectrum information. As another example, the signal analysis operation may extract periodicity information by taking a log of frequency spectrum information and performing FFT on the same. That is, the signal analysis operation may obtain a cepstrum of a reception signal, and may use the same as periodicity information. In addition, the signal analysis operation may extract periodicity information of the frequency spectrum by changing frequency spectrum information into a different domain. A method of changing into a different domain may include various methods, such as FFT, binary FFT, IFFT, and the like, which have been described, and may not be limited to a predetermined method.

Also, the target object detecting method may include determination operation S1330 that determines whether a clutter structure exists. For example, the determination operation may determine whether a clutter structure exists based on forward image information or road information. As another example, the determination operation may determine whether a clutter structure exists based on periodicity information. Particularly, the determining operation may determine whether a clutter structure exists using a peak component included in the periodicity information. For example, when a peak component included in periodicity information appears in a regular interval range, the determination operation may determine that a clutter signal caused by a clutter structure is included in a reception signal. Therefore, the determination operation may identify, using the periodicity information, periodic expression of a peak component that has not been identified from frequency spectrum information, and may determine whether a clutter structure exists using the periodicity information. The peak component included in the periodicity information may be extracted using a predetermined reference value. Alternatively, the peak component included in the periodicity information may be extracted through the comparison with a neighboring peak component value. In this instance, when a difference between a neighboring peak component and a predetermined peak component exceeds a predetermined reference range, the predetermined peak component may be extracted as a peak component for identifying periodicity.

The target object detecting method may include target detection operation S1340 that suppresses a peak value component of the periodicity information and detects a target object when it is determined that a clutter structure exists. The target detection operation may suppress a peak value component of the periodicity information when it is determined that a clutter structure exists based on the periodicity information. Subsequently, the target detection operation may convert the periodicity information in which the peak value component is suppressed into conversion frequency spectrum information, and may detect a target object. A method of converting periodicity information into frequency spectrum information in the target detection operation may be set to be different based on a method of converting frequency spectrum information into periodicity information. For example, the target detection operation may generate a conversion frequency spectrum by performing IFFT on periodicity information in which a peak value component is suppressed. As another example, the target detection operation may generate a conversion frequency spectrum by performing IFFT on periodicity information in which a peak value component is suppressed and multiplying the same with an existing frequency spectrum. As another example, the target detection operation may generate a conversion frequency spectrum by performing FFT or IFFT on periodicity information in which a peak value component is suppressed. In addition, the target detection operation may apply various methods to convert a domain of periodicity information into a frequency domain.

The target detection operation may detect a target object using a conversion frequency spectrum. In this instance, since a peak value component is suppressed in the periodicity information, a target signal may be readily detected from the conversion frequency spectrum. Therefore, the target detection operation may detect a target signal using detection threshold value information. The detection threshold value may be dynamically changed based on whether a clutter structure exists.

According to the above descriptions, there is provided a method and apparatus for recognizing whether a structure exists that may significantly generate a clutter signal, such as a steel tunnel, by analyzing a signal obtained by a radar device. Also, according to an embodiment, there is provided a method and apparatus for recognizing a structure that may significantly generate a clutter signal, and for enhancing a target detecting performance for improving safety in a section where the corresponding structure is installed.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention. Although a preferred embodiment of the present invention has been described for illustrative purposes, those skilled in the art will appreciate that various modifications, additions and substitutions are possible, without departing from the scope and spirit of the invention as disclosed in the accompanying claims. The scope of the present invention shall be construed on the basis of the accompanying claims in such a manner that all of the technical ideas included within the scope equivalent to the claims belong to the present invention.

What is claimed is:

1. An apparatus for detecting a target object, the apparatus comprising:
   a signal transmitting unit configured to transmit a transmission signal for detecting a target object;
   a signal receiving unit configured to receive a reception signal generated by a reflection of the transmission signal;
   a signal analyzing unit configured to calculate frequency spectrum information of the reception signal, and to extract periodicity information for determining periodicity of the frequency spectrum information;
   a determining unit configured to determine whether a clutter structure exists; and
   a target detecting unit configured to detect a target object by suppressing a peak value component of the periodicity information when it is determined that a clutter structure exists,
   wherein the signal analyzing unit is configured to calculate binary frequency spectrum information obtained by converting the frequency spectrum information into a value of 0 or 1 based on a predetermined binary reference value, and to extract the periodicity information by executing fast Fourier Transform (FFT) on the binary frequency spectrum information.

2. The apparatus of claim 1, wherein the clutter structure includes one or more steel structures disposed at regular intervals.

3. The apparatus of claim 1, wherein the signal analyzing unit is configured to extract the periodicity information by executing the fast Fourier Transform (FFT) on the frequency spectrum information.

4. The apparatus of claim 1, wherein the signal analyzing unit is configured to extract the periodicity information by executing inverse fast Fourier transform (IFFT) on the frequency spectrum information.

5. The apparatus of claim 1, wherein the determining unit is configured to determine whether the clutter structure exists based on at least one of forward image information and road information.

6. The apparatus of claim 1, wherein the determining unit is configured to determine whether the clutter structure exists based on the periodicity information.

7. The apparatus of claim 6, wherein the determining unit is configured to determine that the clutter structure exists when a peak value component of the periodicity information is generated periodically within a regular interval range.

8. The apparatus of claim 6, wherein the determining unit is configured to determine that the clutter structure exists when a peak value component that exceeds a predetermined reference magnitude exists in the periodicity information.

9. The apparatus of claim 6, wherein the determining unit is configured to determine that the clutter structure exists when a peak value component that exceeds a predetermined reference magnitude exists within a predetermined index section of the periodicity information.

10. The apparatus of claim 1, wherein the target detecting unit is configured to: suppress, in the periodicity information, a peak value component having a value greater than or equal to a predetermined peak reference value, convert the periodicity information in which the peak value component is suppressed into conversion frequency spectrum information, and extract a target signal reflected by the target object.

11. The device of claim 1, wherein, when a difference between a first peak value, and peak values located before and after the first peak value on the basis of the first peak value included in the periodicity information, is greater than or equal to a reference value, the target detecting unit is configured to: suppress a first peak value component, convert the periodicity information into conversion frequency spectrum information, and extract a target signal reflected from the target object.

12. An apparatus for detecting a target object, the apparatus comprising:
    a signal transmitting unit configured to transmit a transmission signal for detecting a target object;
    a signal receiving unit configured to receive a reception signal generated by a reflection of the transmission signal;
    a signal analyzing unit configured to calculate frequency spectrum information of the reception signal, and to extract periodicity information for determining periodicity of the frequency spectrum information;
    a determining unit configured to determine whether a clutter structure exists; and
    a target detecting unit configured to detect a target object by suppressing a peak value component of the periodicity information when it is determined that a clutter structure exists, wherein the signal analyzing unit is configured to calculate binary peak frequency spectrum information by converting a peak component of the frequency spectrum information into a value of 0 or 1 based on a predetermined binary reference value, and to extract the periodicity information by executing fast Fourier Transform (FFT) on the binary peak frequency spectrum information.

13. A method of detecting a target object, the method comprising:
    a signal transmission operation to transmit a transmission signal for detecting a target object;
    a signal reception operation to receive a reception signal generated by a reflection of the transmission signal;
    a signal analysis operation to calculate frequency spectrum information of the reception signal, and to extract periodicity information for determining periodicity of the frequency spectrum information;

a determination operation to determine whether a clutter structure exists; and a target detection operation to detect a target object by suppressing a peak value component of the periodicity information when it is determined that the clutter structure exists, wherein the signal analysis operation comprises calculating binary frequency spectrum information obtained by converting the frequency spectrum information into a value of 0 or 1 based on a predetermined binary reference value, and to extract the periodicity information by executing fast Fourier Transform (FFT) on the binary frequency spectrum information.

14. The method of claim 13, wherein the signal analysis operation the comprises:

extracting the periodicity information by executing the fast Fourier transform (FFT) on the frequency spectrum information.

15. The method of claim 13, wherein the determination operation comprises:

determining that the clutter structure exists when a peak value component of the periodicity information is generated periodically within a regular interval range.

16. The method of claim 13, wherein the target detection operation comprises:

suppressing a peak value component having a value greater than or equal to a predetermined peak reference value from the periodicity information, converting the periodicity information in which the peak value component is suppressed into conversion frequency spectrum information, and extracting a target signal reflected by the target object.

* * * * *